(12) United States Patent
Ku et al.

(10) Patent No.: US 10,917,794 B2
(45) Date of Patent: *Feb. 9, 2021

(54) METHOD AND DEVICE FOR TERMINAL CALCULATING REDISTRIBUTION RANGE IN WIRELESS COMMUNICATION SYSTEM

(71) Applicant: LG ELECTRONICS INC., Seoul (KR)

(72) Inventors: Gwanmo Ku, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,814

(22) Filed: Aug. 21, 2019

(65) Prior Publication Data

US 2019/0380039 A1   Dec. 12, 2019

Related U.S. Application Data

(63) Continuation of application No. 15/569,560, filed as application No. PCT/KR2016/005145 on May 16, 2016, now Pat. No. 10,440,580.

(60) Provisional application No. 62/162,658, filed on May 16, 2015.

(51) Int. Cl.
*H04W 16/08* (2009.01)
*H04W 24/02* (2009.01)
*H04W 28/08* (2009.01)
*H04W 88/02* (2009.01)

(52) U.S. Cl.
CPC .......... *H04W 16/08* (2013.01); *H04W 24/02* (2013.01); *H04W 28/08* (2013.01); *H04W 88/02* (2013.01)

(58) Field of Classification Search
CPC ..... H04W 16/08; H04W 24/02; H04W 28/08; H04W 88/02
See application file for complete search history.

(56) References Cited

U.S. PATENT DOCUMENTS

| 10,440,580 | B2* | 10/2019 | Ku ..................... H04W 16/08 |
| 2006/0128394 | A1 | 6/2006 | Turina et al. |
| 2006/0142021 | A1 | 6/2006 | Mueckenhein et al. |
| 2014/0004862 | A1 | 1/2014 | Ekemark |
| 2014/0024382 | A1 | 1/2014 | Zou et al. |

(Continued)

FOREIGN PATENT DOCUMENTS

| CN | 101009541 A | 8/2007 |
| JP | 2002-016958 A | 1/2002 |

(Continued)

OTHER PUBLICATIONS

R2-142495: 3GPP TSG-RAN WG2 Meeting #86, May 19-23, 2014, Seoul, South Korea, "Idle UE Distribution in Macro Only System and HetNets," Alcatel-Lucent, Verizon, pp. 1-6.

(Continued)

*Primary Examiner* — Omar J Ghowrwal
(74) *Attorney, Agent, or Firm* — Dentons US LLP

(57) ABSTRACT

Provided are a method for a terminal calculating a redistribution range in a wireless communication system, and a device supporting same. A terminal may receive redistribution factors from a network and calculate a redistribution range on the basis of a valid redistribution factor among the received redistribution factors.

20 Claims, 12 Drawing Sheets

(56) References Cited

U.S. PATENT DOCUMENTS

2015/0146539 A1    5/2015  Mehta .................... H04L 45/22
                                                                370/237
2015/0230141 A1*   8/2015  Zou ...................... H04W 48/06
                                                                455/437

FOREIGN PATENT DOCUMENTS

| WO | 2013189540 A1 | 12/2013 |
| WO | 2014/014859 A1 | 1/2014 |
| WO | 2015021250 A1 | 2/2015 |
| WO | 2015069064 | 5/2015 |

OTHER PUBLICATIONS

R2-151659: 3GPP TSG-RAN WG2 Meeting #89bis, Apr. 20-24, 2015, Bratislava, Slovakia, "Idle mode load balancing in HetNets," LG Electronics Inc., pp. 1-2.

R2-156627: 3GPP TSG-RAN WG2 Meeting #92, Nov. 16-20, 2015, Anaheim, U.S.A., "Introduction of load redistribution in RRC_IDLS," ZTE, pp. 1-6.

Alcatel-Lucent: "Idle UE Distribution in Macro Only System and HetNets", R2-143638, 3GPP TSG RAN WG2 Meeting #87, Dresden, Germany, Aug. 18-22, 2014.

* cited by examiner

METHOD AND DEVICE FOR TERMINAL CALCULATING REDISTRIBUTION RANGE IN WIRELESS COMMUNICATION SYSTEM

CROSS-REFERENCE TO RELATED APPLICATIONS

This application is a continuation of U.S. application Ser. No. 15/569,560, filed on Oct. 26, 2017, which is the National Stage filing of International Application No. PCT/KR2016/005145, filed on May 16, 2016, which claims the benefit of U.S. Provisional Application No. 62/162,658 filed on May 16, 2015, the contents of which are all hereby incorporated by reference herein in their entirety.

BACKGROUND OF THE INVENTION

Field of the Invention

The present invention relates to a wireless communication system, and more particularly, to a method for calculating, by a user equipment (UE), a redistribution range, and a device for supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Cellular is concept proposed to overcome a restriction of a service region and a limitation of a frequency and subscriber capacity. This is a method of providing communication coverage by changing single high-power base station to a plurality of low-power base stations. That is, a mobile communication service region is divided in unit of several small cells so that different frequencies are assigned to adjacent cells, and two cells which are sufficiently spaced apart from each other and thus have no interference occurrence use the same frequency band to spatially reuse a frequency.

Meanwhile, there may be a particularly high communication demand in a specific region such as a hotspot inside a cell, and reception sensitivity of radio waves may deteriorate in a specific region such as a cell edge or a coverage hole. With the advance of a wireless communication technique, a small cell may be installed inside a macrocell for the purpose of enabling communication in the hotspot, the cell edge, and the coverage hole. A pico cell, a femto cell, a microcell, or the like is a type of the small cell. The small cell may be located inside or outside the macrocell. In this case, the small cell may be located at a position where the macrocell does not reach, or may be located indoors or at the office. Such a network may be called a heterogeneous network (HetNet). In this case, the heterogeneous network does not have to use different radio access mechanisms. In a heterogeneous network environment, the macrocell is a relatively large coverage cell, and the small cell such as the femtocell and the picocell is a small coverage cell. The macrocell and the small cell may serve to distribute the same traffic or transmit traffic of different QoS. In the heterogeneous network environment, coverage overlapping may occur between the plurality of macrocells and small cells.

SUMMARY OF THE INVENTION

When a plurality of frequencies is deployed in a heterogeneous network, a user equipment (UE) in a RRC_IDLE mode needs to perform an idle mode change based on load distribution information received from the network in order to redistribute the UE in the RRC_IDLE mode. However, when the UE does not detect some frequencies in a frequency list included in a system information block received from the network (that is, when the UE is located outside the coverage of some frequencies), the UE cannot be redistributed to some frequencies. Therefore, the present invention proposes a method for calculating, by a UE, a redistribution range based on a valid redistribution factor among redistribution factors received from a network, and a device for supporting the same.

According to one embodiment, there is provided a method for calculating, by a UE, a redistribution range in a wireless communication system. The method may include: receiving redistribution factors from a network; and calculating a redistribution range based on a valid redistribution factor among the received redistribution factors.

The redistribution range may be calculated as follows.

$$\text{Redistribution range } [i] = \frac{\text{Valid redistribution factor } [i]}{\sum_{j=0}^{\substack{j=\text{Total number of frequencies} \\ \text{with valid redistribution factor}-1}} \text{Valid redistribution factor } [j]}$$

The redistribution factors may be a redistribution probability value by frequency for load balancing, and the valid redistribution factor may be a redistribution probability value of a frequency available for the UE. The method may further include performing, by the UE, a redistribution procedure based on the calculated redistribution range. The redistribution procedure may be performed between frequencies available for the UE.

The redistribution range may be calculated as follows.

$$\text{Redistribution range } [i] = \frac{\text{Valid redistribution factor } [i]}{\sum_{j=0}^{\substack{j=\text{Total number of cells with} \\ \text{valid redistribution factor}-1}} \text{Valid redistribution factor } [j]}$$

The redistribution factors may be a redistribution probability value by cell for load balancing, and the valid redistribution factor may be a redistribution probability value of a cell available for the UE The redistribution factors may be received via a system information block (SIB).

The method may further include receiving, by the UE, a frequency list from the network. The frequency list may be received via a SIB. The redistribution range may be calculated when a frequency available for the UE is different from a frequency included in the frequency list.

The UE may be in an RRC_IDLE mode.

According to another embodiment, there is provided a UE for calculating a redistribution range in a wireless communication system. The UE may include: a memory; a transceiver; and a processor to connect the memory and the transceiver, wherein the processor may be configured to: control the transceiver to receive redistribution factors from a network; and calculate a redistribution range based on a valid redistribution factor among the received redistribution factors.

Load may be efficiently distributed in a heterogenenous network environment.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi™), IEEE 802.16 (WiMAX™), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
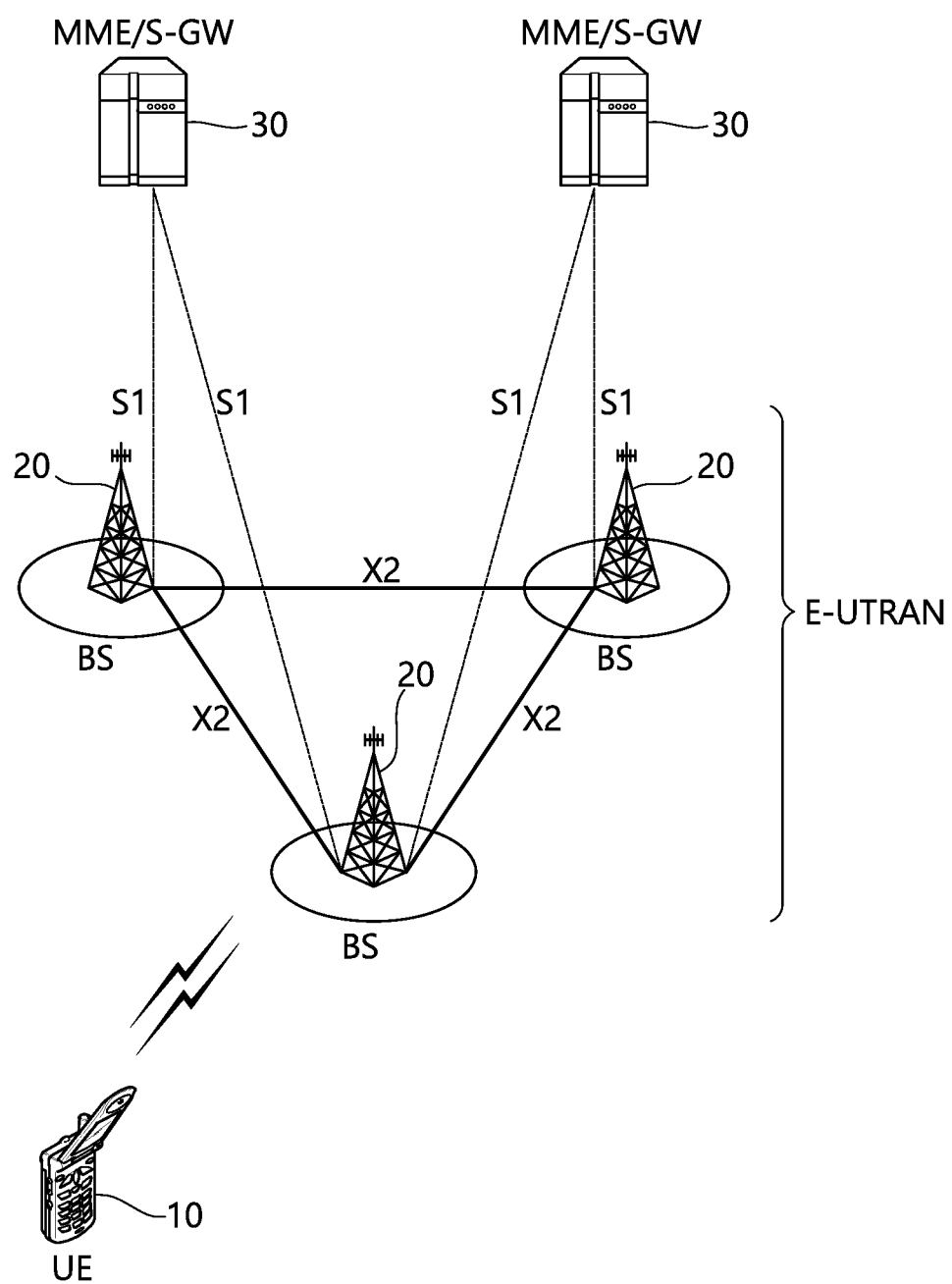
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
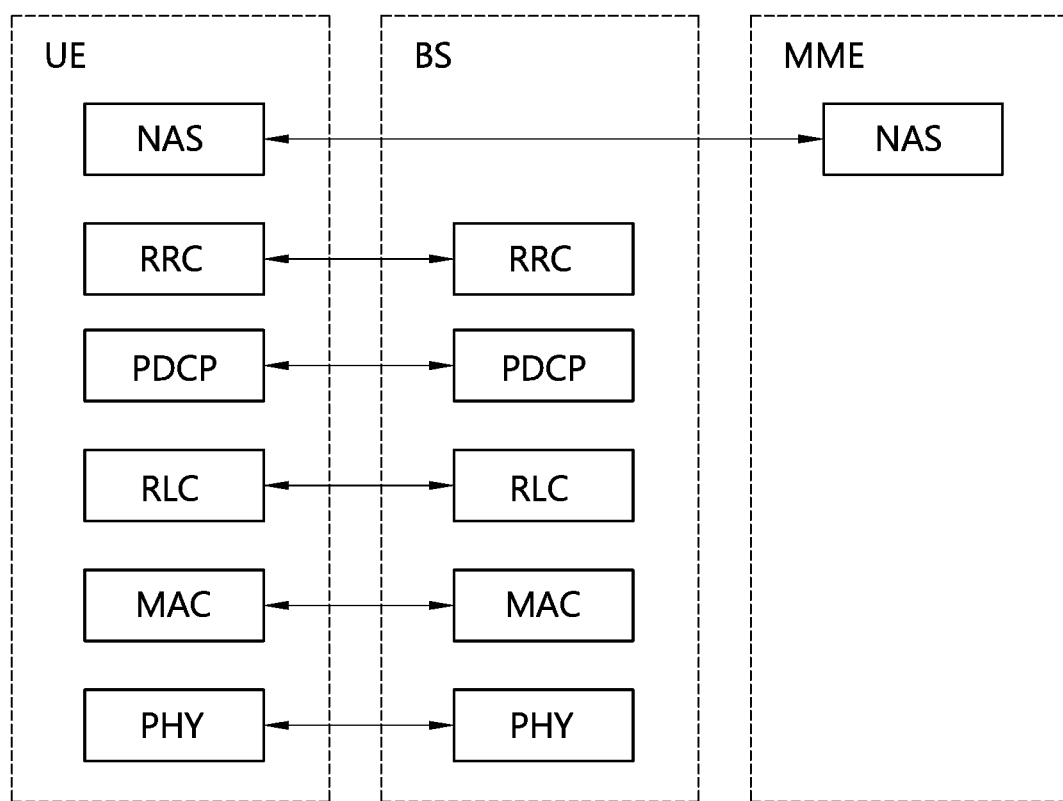
FIG. 2 shows a control plane of a radio interface protocol of an LTE system.
Figure 3:
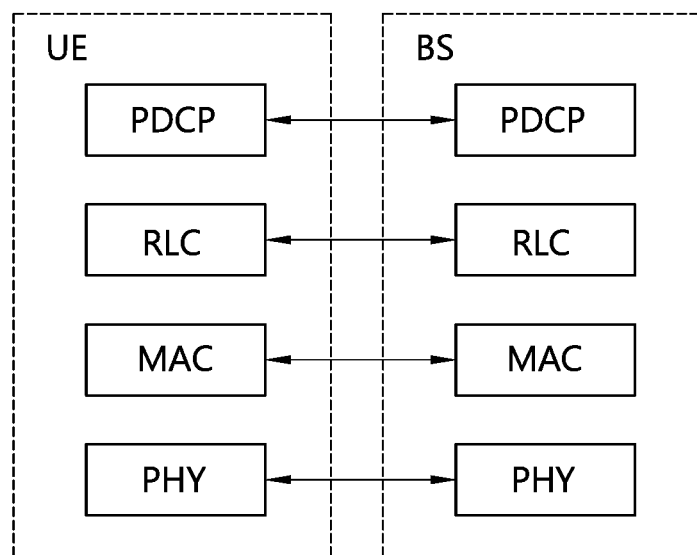
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
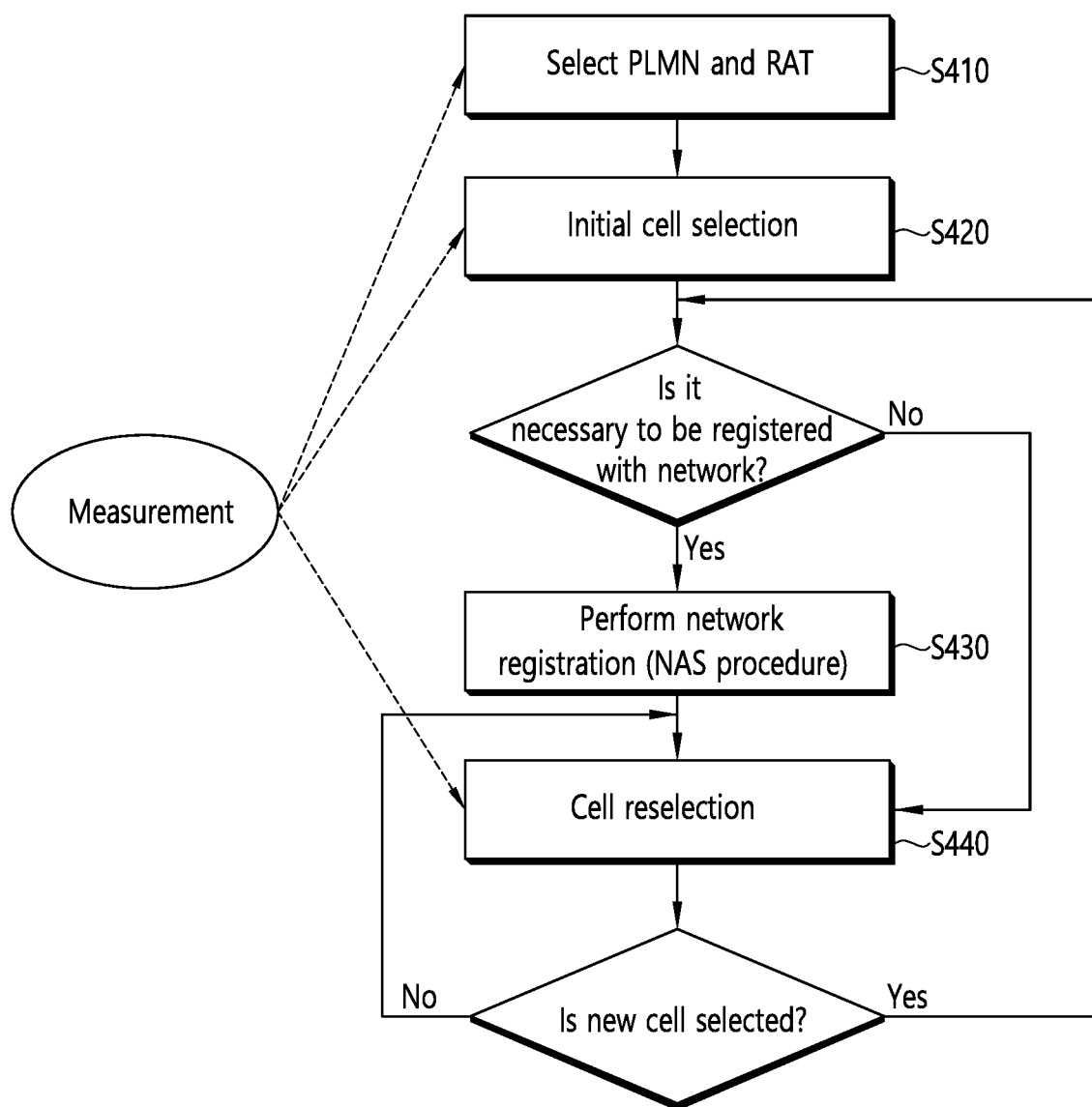
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
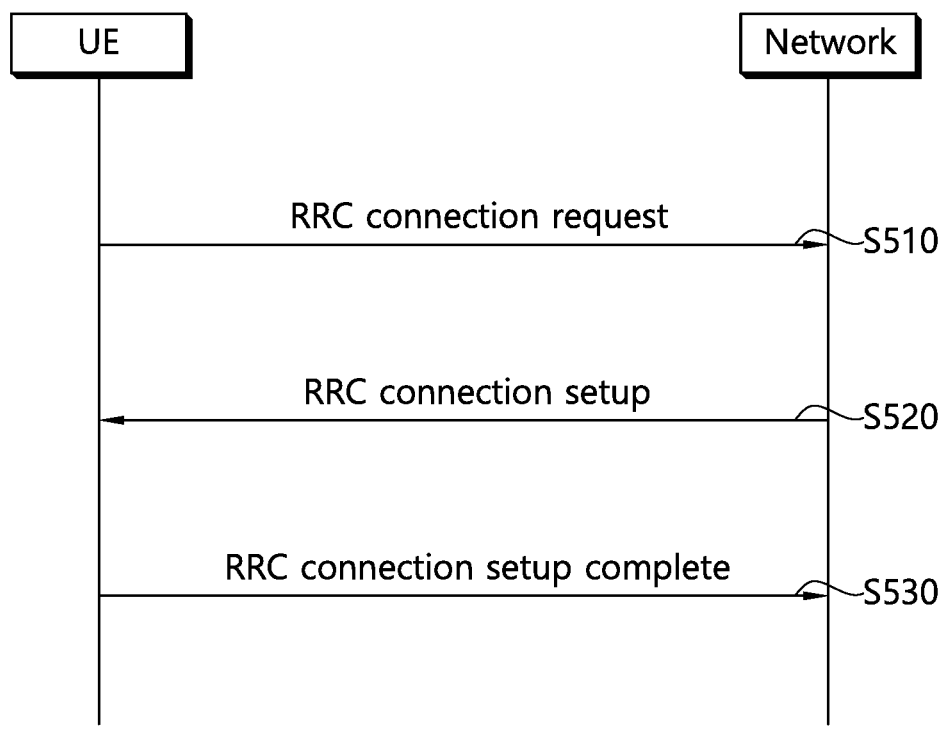
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
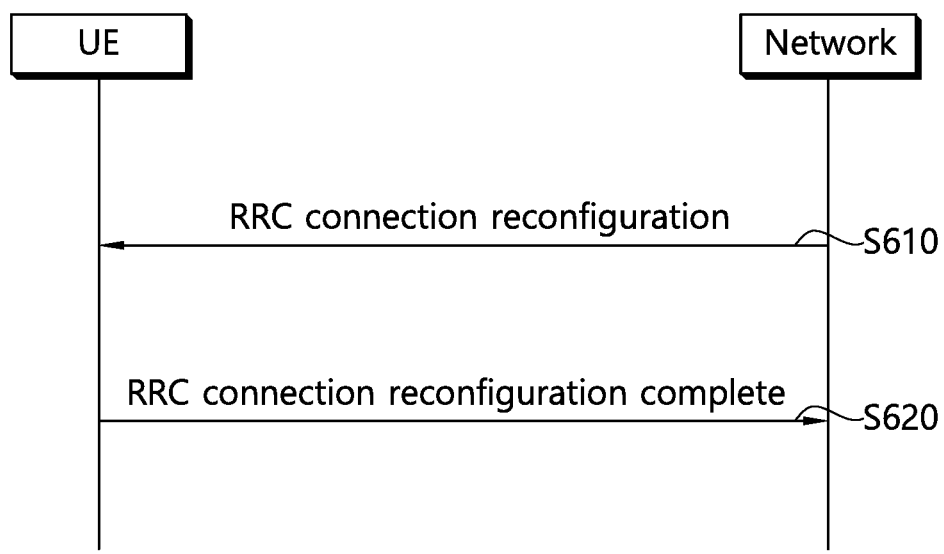
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a suitable quality cell. For example, a UE where power is turned-on just before should select the suitable quality cell to be registered in a network. If the UE in an RRC connection state enters in an RRC idle state, the UE should selects a cell for stay in the RRC idle state. In this way, a procedure of selecting a cell satisfying a certain condition by the UE in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the UE.

Hereinafter, a method and a procedure of selecting a cell by a UE in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
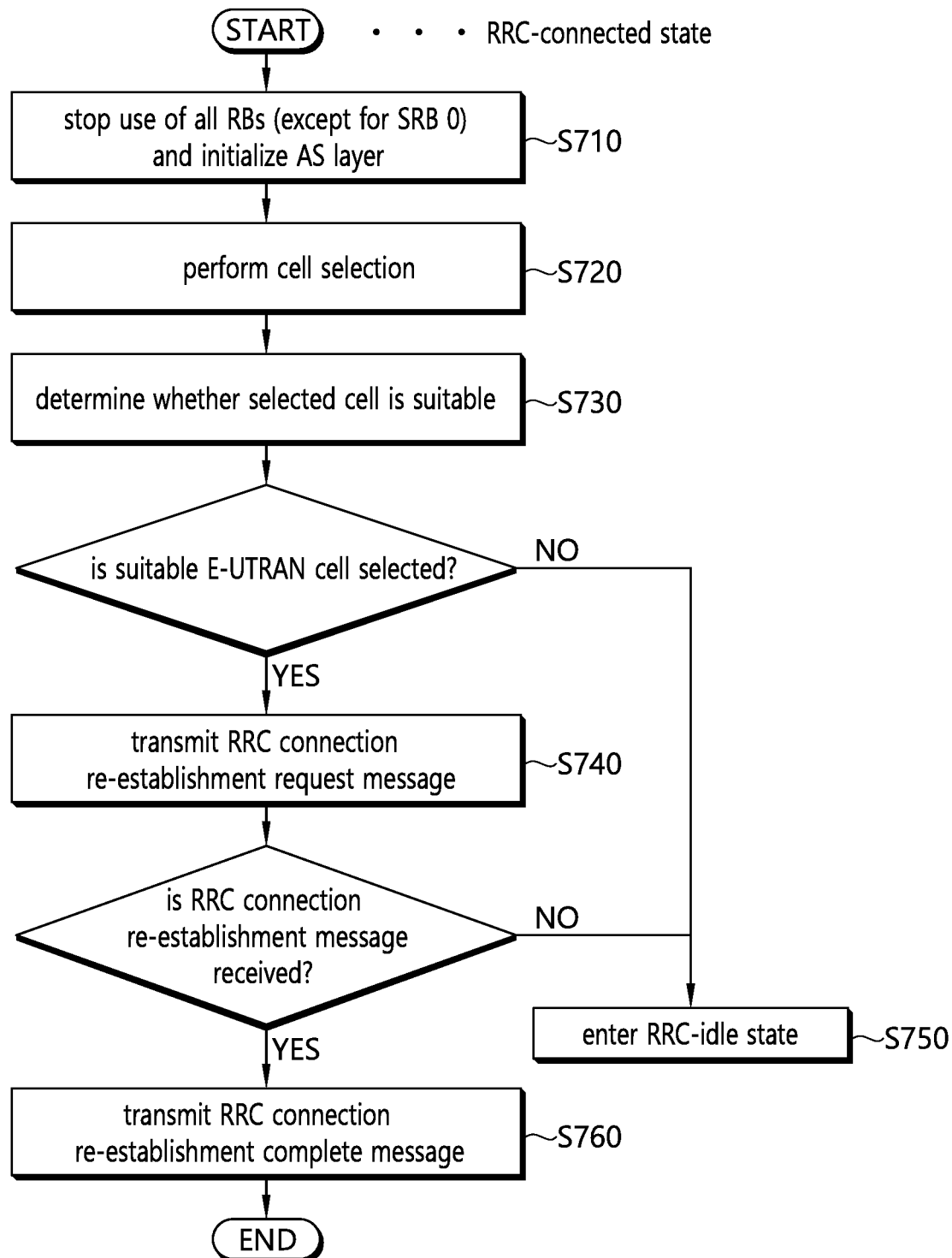
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
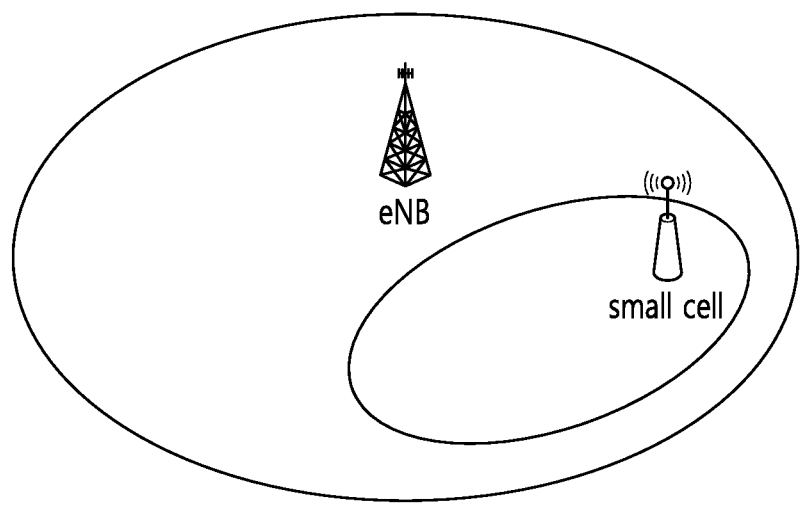
FIG. 8 shows an example of a heterogeneous network (HetNet).

FIG. 8 shows an example of a heterogeneous network (HetNet).

Referring to FIG. 8, the heterogeneous network is a network in which several types of cells co-exist. Many nodes are present in an overlapping manner in the heterogeneous network, and a representative example thereof may include a picocell, a microcell, a femtocell, a home eNB, or the like. Although a usage of the small cells is not limited, in general, the picocell may be installed in a region having a high data service requirement, the femtocell may be installed in an indoor office or home, and a radio relay may be installed for the purpose of compensating for coverage of the macrocell. In addition, the small cells may be divided into a closed subcarrier group (CSG) which can be used by only a specific user, an open access which allows an access to a normal user, and a hybrid access which uses the two methods in combination.

A plurality of frequencies may be deployed in the heterogeneous network. For example, macrocells having different frequencies may be deployed to overlap, or small cells having different frequencies may be deployed to overlap within a macrocell. When a plurality of frequencies may be deployed in the heterogeneous network, the network needs to broadcast a distribution parameter relating to a carrier frequency (for example, a redistribution probability by frequency) via system information in order to redistribute a UE in the RRC_IDLE mode. Then, the UE in the RRC_IDLE mode can perform an idle mode change according to the received distribution parameter. For example, when the network broadcasts a redistribution probability by frequency through system information, the UE may generate a random uniform distribution value ranging between 0 and 1 and may reselect a cell corresponding to the redistribution probability. For a detailed description of cell reselection, suppose that the redistribution probability of a first macrocell (or first frequency) broadcasted by the network through the system information is 0.1, the redistribution probability of a second macrocell (or a second frequency) is 0.2, the redistribution probability of a first small cell (or a third frequency) is 0.3, and the redistribution probability of a second small cell (or a fourth frequency) is 0.4. When the random value generated by the UE is 0.15, the UE can move to the second macrocell (or the second frequency). When the random value generated by the UE is 0.7, the UE can move to the second small cell (or the fourth frequency). That is, for a successful idle mode change, the total sum of the redistribution probabilities by frequency needs to be 1.

However, when the UE in the RRC_IDLE mode is located outside the service coverage of some carrier frequencies in a carrier frequency list included in the system information, the total sum of the redistribution probabilities by frequency broadcast from the network for the UE in the RRC_IDLE mode may not be 1. That is, in the foregoing embodiment, when the UE is located within the coverage of the first macrocell (or the first frequency), the second macrocell (or the second frequency), and the first small cell (or the third frequency) but is located outside the coverage of the second small cell (or the fourth frequency), the total sum of the redistribution probabilities for the UE may be 0.6 (=0.1+ 0.2+0.3). Therefore, the UE in the RRC_IDLE mode may not be able to perform redistribution based on the redistribution probabilities broadcast from the network. For example, when the UE in the RRC_IDLE mode is located outside the service coverage of some carrier frequencies in a carrier frequency list included in the system information, the UE in the RRC_IDLE mode may not be redistributed to the corresponding frequencies. Accordingly, in order to solve the foregoing problem, the present invention proposes a method for calculating, by a UE, a redistribution range and a device for supporting the same.

Hereinafter, a method for calculating, by a UE, a redistribution range based on a received distribution parameter according to an embodiment of the present invention will be described.

When a UE receives a distribution parameter from a network, the UE can perform a cell selection or cell reselection procedure using intended distribution statistics. In the present invention, the intended distribution statistics may be a set of redistribution factors. The redistribution factors may be redistribution probability values by frequency for load balancing that are received from the network. Alternatively, the redistribution factors may be redistribution probability values by cell for load balancing that are received from the network. When the UE cannot detect some carrier frequencies in a carrier frequency list included in an SIB received from the network (that is, some carrier frequencies in the carrier frequency list included in the SIB are unavailable), the UE may need to consider new redistribution statistics. The new redistribution statistics may be triggered by a parameter selected at a carrier frequency available for the UE. In the present invention, the new redistribution statistics may be a set of newly calculated redistribution ranges. A method for calculating a redistribution range may include the following steps.

(1) Step 1

Each UE may receive a SIB from a network. The UE may be a UE in the RRC_IDLE mode. The UE may classify frequencies included in a carrier frequency list received through the SIB into a carrier frequency having a distribution parameter and a carrier frequency having no distribution parameter. In the present invention, the distribution parameter may be referred to as a redistribution factor. That is, the UE may classify the frequencies included in the carrier frequency list received through the SIB into a carrier frequency having a redistribution factor and a carrier frequency having no redistribution factor.

(2) Step 2

The UE may detect a specific carrier frequency among carrier frequencies having a redistribution factor. The specific carrier frequency may be a frequency that can be detected/used by the UE as a result of measurement. In the present invention, a redistribution factor of a frequency/cell that can be detected/used by the UE among redistribution factors may be referred to as a valid redistribution factor.

Furthermore, the UE may calculate a redistribution range using the valid redistribution factor. That is, the UE may calculate new redistribution statistics using the valid redistribution factor.

The redistribution range may be defined by Equation 2.

$$Wi = \frac{Pi}{\sum_{all\ j\ in\ D} Pj}$$ [Equation 2]

Here, i is a carrier frequency index in an index set for carrier frequencies that can be detected/used by the UE; Pi is a received distribution parameter associated with a carrier frequency index i; j is a parameter for normalization; and D is a set of carrier frequencies that can be detected/used by the UE.

That is, according to Equation 2, a redistribution factor (Pi) associated with an index i is divided by the sum of redistribution factors of frequencies/cells that can be detected/used by the UE, thereby obtaining the redistribution range (Wi). That is, new redistribution statistics may be obtained.

The redistribution range may be defined by Equation 3 or 4.

$$\text{Redistribution range } [i] = \frac{\text{Valid redistribution factor } [i]}{\sum_{j=0}^{j=\text{Total number of frequencies with valid redistribution factor}-1} \text{Valid redistribution factor } [j]}$$ [Equation 3]

$$\text{Redistribution range } [i] = \frac{\text{Valid redistribution factor } [i]}{\sum_{j=0}^{j=\text{Total number of cells with valid redistribution factor}-1} \text{Valid redistribution factor } [j]}$$ [Equation 4]

According to Equation 3 or Equation 4, similarly to Equation 2, a valid redistribution factor is divided by the sum of all valid redistribution factors, thereby obtaining a redistribution range.

(3) Step 3

The UE may perform a redistribution procedure between available carrier frequencies based on the new redistribution statistics. That is, the UE may perform a redistribution procedure between available carrier frequencies based on the redistribution range calculated in Step 2.

Figure 9:
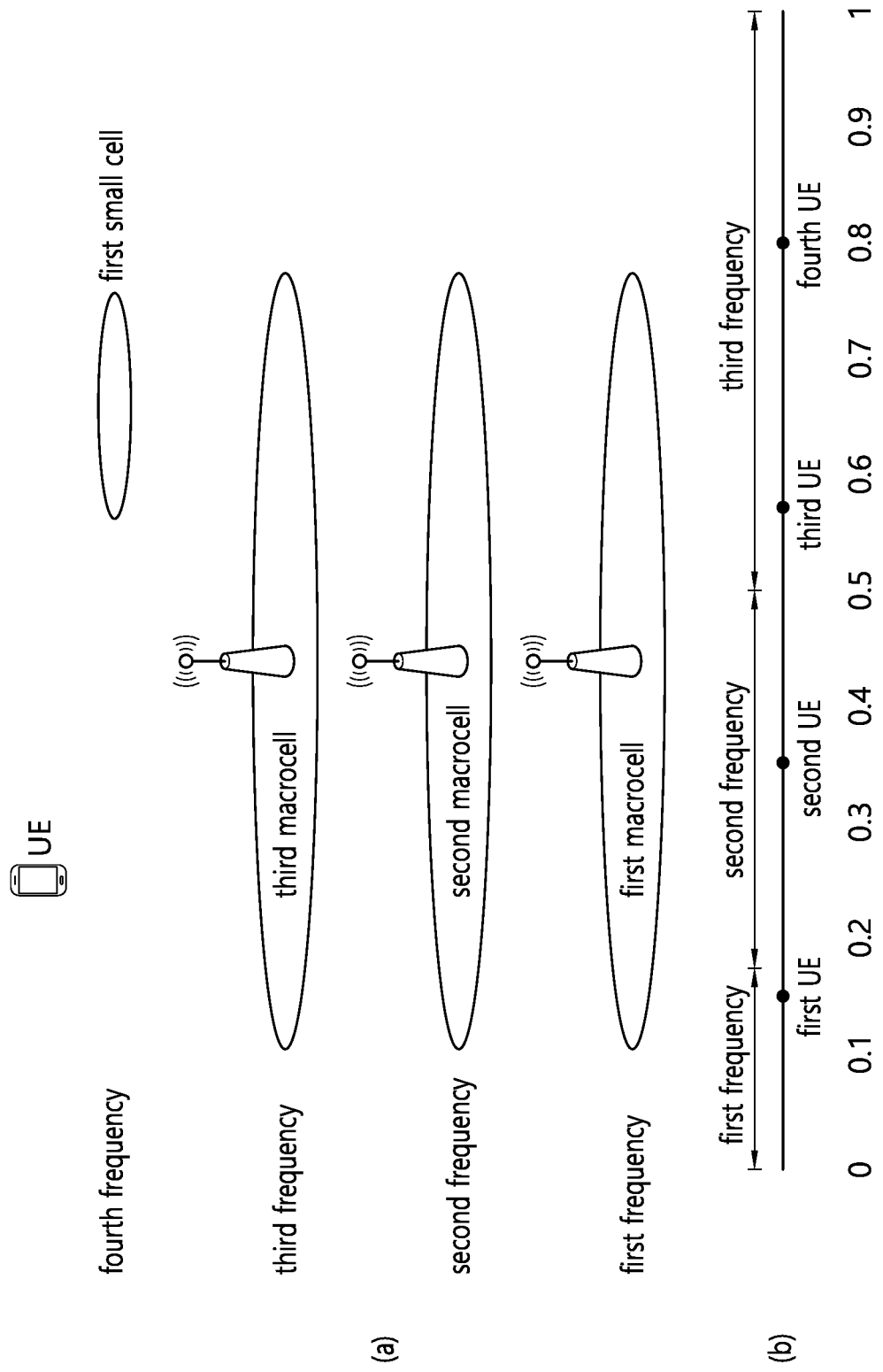
FIG. 9 illustrates a method for a UE to calculate a redistribution range and to perform a redistribution procedure according to an embodiment of the present invention.

FIG. 9 illustrates a method for a UE to calculate a redistribution range and to perform a redistribution procedure according to an embodiment of the present invention.

In FIG. 9(a), suppose that the UE is in the RRC_IDLE mode, is located within the coverage of a first macrocell, a second macrocell, and a third macrocell, but is located outside the coverage of a first small cell. Suppose that the first macrocell uses a first frequency, the second macrocell uses a second frequency, the third macrocell uses a third frequency, and the first small cell uses a fourth frequency.

The first macrocell may broadcast intended redistribution statistics in order to redistribute all idle UEs in the first macrocell to the first macrocell, the second macrocell, the third macrocell, or the first small cell based on the intended distribution statistics. Suppose that the intended redistribution statistics are as follows.

Redistribution factor of first frequency: 0.1
Redistribution factor of second frequency: 0.2
Redistribution factor of third frequency: 0.3
Redistribution factor of fourth frequency: 0.4

(1) Step 1: Broadcast SIB Information

The first macrocell may broadcast SIB information. Therefore, the UE in the RRC_IDLE mode located within the coverage of the first macrocell may receive a SIB. The SIB may include the following information.

Carrier frequency list: first frequency, second frequency, third frequency, fourth frequency Carrier frequency having redistribution factor (or distribution parameter): first frequency (0.1), second frequency (0.2), third frequency (0.3), fourth frequency (0.4)

Carrier frequency having no redistribution factor: None

Although the embodiment of FIG. 9(a) shows that there is no carrier frequency having no redistribution factor, this is only an example. Instead, there may be a carrier having no redistribution factor.

(2) Step 2: Calculate Redistribution Range

In the embodiment of FIG. 9(a), since the UE is located within the coverage of the first to third macrocells but is located outside the coverage of the first small cell, a set (D) of frequencies that can be used/detected by the UE is {first frequency, second frequency, third frequency}. Therefore, in the embodiment of FIG. 9(a), the redistribution factors of the first macrocell, the second macrocell, and the third macrocell are valid redistribution factors. That is, D={first frequency, second frequency, third frequency} may be provided for the UEs. The UE cannot detect some frequencies (that is, the fourth frequency) included in the carrier frequency list and thus may calculate a redistribution range. A redistribution range (or new redistribution statistics) is calculated by Equation 2, Equation 3 or Equation 4 as follows.

Redistribution range of first frequency: 0.1/(0.1+0.2+0.3)=0.17
Redistribution range of second frequency: 0.2/(0.1+0.2+0.3)=0.33
Redistribution range of third frequency: 0.3/(0.1+0.2+0.3)=0.5

(3) Step 3: Perform Redistribution Procedure

Each UE may select a random uniform distribution value ranging between 0 and 1. Then, the UE may select a carrier frequency from {first frequency, second frequency, third frequency} associated with the selected random value. For example, suppose that a first UE selects a value of 0.15, a second UE selects a value of 0.35, a third UE selects a value of 0.59, and a fourth UE selects a value of 0.8. Referring to FIG. 9(b), the first UE may (re)select a cell of the first frequency (that is, the first macrocell), the second UE may (re)select a cell of the second frequency (that is, the second macrocell), the third UE may (re)select a cell of the third frequency (that is, the third macrocell), and the fourth UE may (re)select a cell of the third frequency (that is, the third macrocell).

Figure 10:
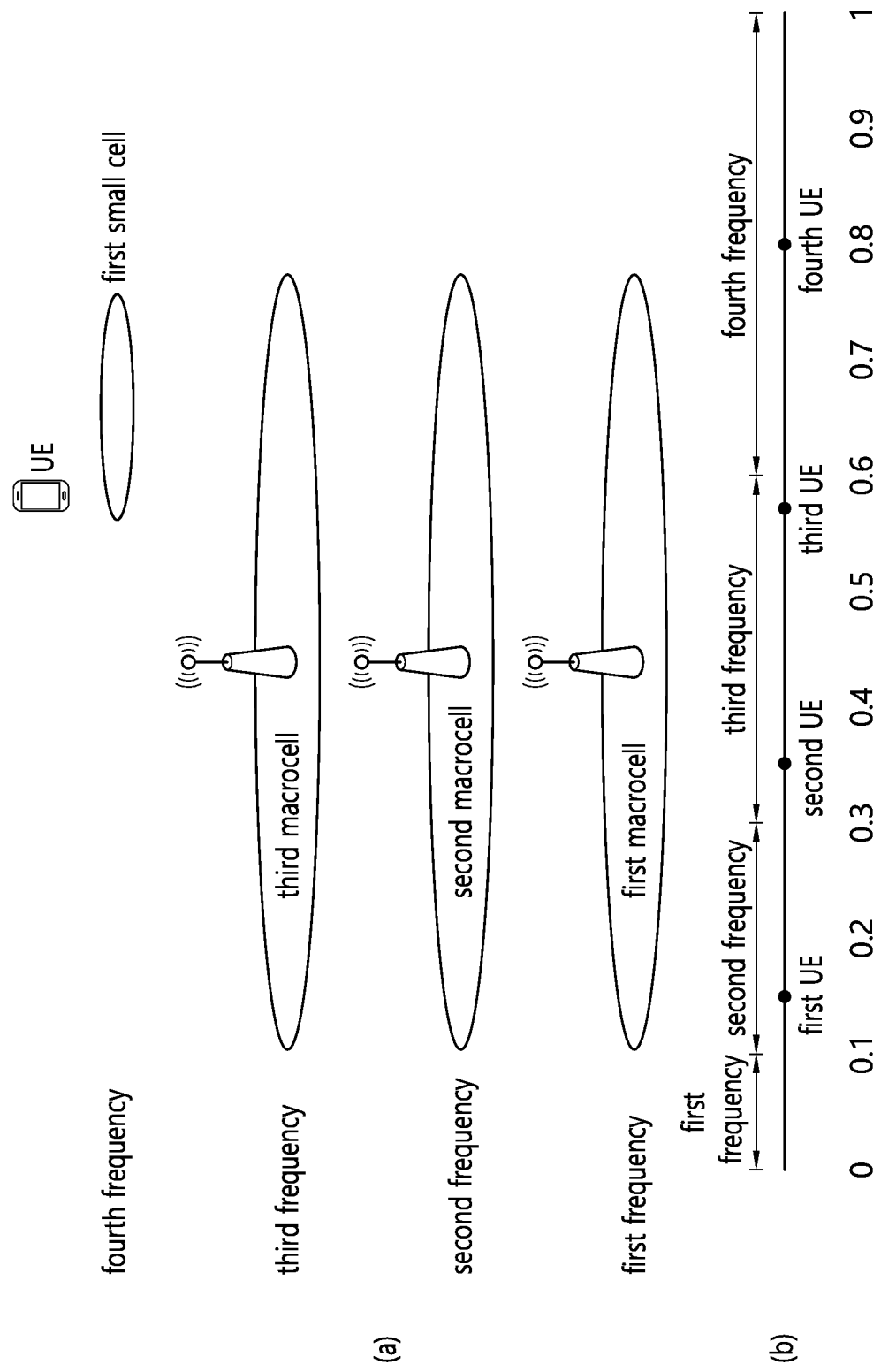
FIG. 10 illustrates a method for a UE to calculate a redistribution range and to perform a redistribution procedure according to an embodiment of the present invention.

FIG. 10 illustrates a method for a UE to calculate a redistribution range and to perform a redistribution procedure according to an embodiment of the present invention.

In FIG. 10(a), suppose that the UE is in the RRC_IDLE mode and is located within the coverage of a first macrocell, a second macrocell, a third macrocell, and a first small cell. Suppose that the first macrocell uses a first frequency, the second macrocell uses a second frequency, the third macrocell uses a third frequency, and the first small cell uses a fourth frequency.

The first macrocell may broadcast intended redistribution statistics in order to redistribute all idle UEs in the first macrocell to the first macrocell, the second macrocell, the third macrocell, or the first small cell based on the intended distribution statistics. Suppose that the intended redistribution statistics are as follows.

Redistribution factor of first frequency: 0.1
Redistribution factor of second frequency: 0.2
Redistribution factor of third frequency: 0.3
Redistribution factor of fourth frequency: 0.4

(1) Step 1: Broadcast SIB Information

The first macrocell may broadcast SIB information. Therefore, the UE in the RRC_IDLE mode located within the coverage of the first macrocell may receive a SIB. The SIB may include the following information.

Carrier frequency list: first frequency, second frequency, third frequency, fourth frequency Carrier frequency having redistribution factor (or distribution parameter): first frequency (0.1), second frequency (0.2), third frequency (0.3), fourth frequency (0.4)

Carrier frequency having no redistribution factor: None (2) Step 2: Calculate Redistribution Range In the embodiment of FIG. 10(a), since the UE is located within the coverage of the first macrocell, the second macrocell, the third macrocell, and the first small cell, a set (D) of frequencies that can be used/detected by the UE is {first frequency, second frequency, third frequency}. Therefore, in the embodiment of FIG. 10(a), the redistribution factors of the first macrocell, the second macrocell, the third macrocell, and the first small cell are valid redistribution factors. That is, D={first frequency, second frequency, third frequency, fourth frequency} may be provided for the UE. The UE detects all frequencies included in the carrier frequency list and thus may not calculate a redistribution range. That is, intended redistribution statistics may be used as they are. Alternatively, although the UE detects all frequencies included in the carrier frequency list, the UE may calculate a redistribution range. In this case, the intended redistribution statistics may be the same as new redistribution statistics obtained by calculating a redistribution range.

(3) Step 3: Perform Redistribution Procedure

Each UE may select a random uniform distribution value ranging between 0 and 1. Then, the UE may select a carrier frequency from {first frequency, second frequency, third frequency, fourth frequency} associated with the selected random value. For example, suppose that a first UE selects a value of 0.15, a second UE selects a value of 0.35, a third UE selects a value of 0.59, and a fourth UE selects a value of 0.8. Referring to FIG. 10(b), the first UE may (re)select a cell of the second frequency (that is, the second macrocell), the second UE may (re)select a cell of the third frequency (that is, the third macrocell), the third UE may (re)select a cell of the third frequency (that is, the third macrocell), and the fourth UE may (re)select a cell of the fourth frequency (that is, the first small cell).

Figure 11:
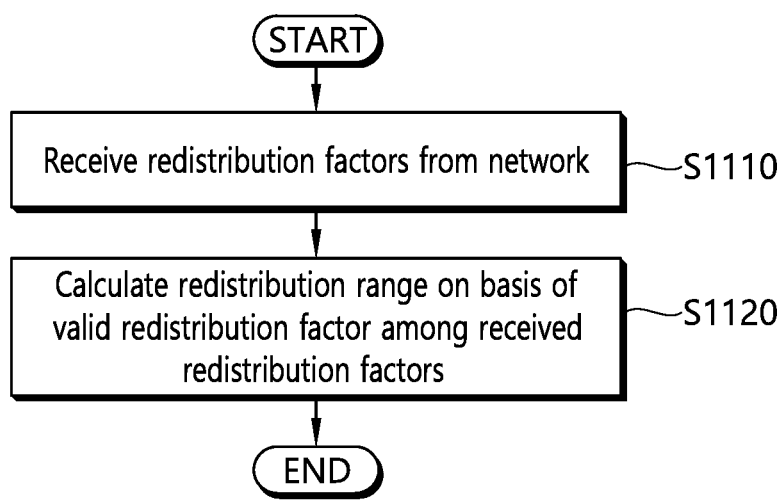
FIG. 11 is a block diagram illustrating a method for calculating, by a UE, a redistribution range according to an embodiment of the present invention.

FIG. 11 is a block diagram illustrating a method for calculating, by a UE, a redistribution range according to an embodiment of the present invention.

Referring to FIG. 11, the UE may receive redistribution factors from a network (S1110). The redistribution factors may be a redistribution probability value by frequency for load balancing. Alternatively, the redistribution factors may be a redistribution probability value by cell for load balancing. The redistribution factors may be received via a system information block. The UE may be in the RRC_IDLE mode.

The UE may calculate a redistribution range based on a valid redistribution factor among the received redistribution factors (S1120). The redistribution range may be calculated by Equation 3. In this case, the valid redistribution factor may be the redistribution probability value of a frequency available for the UE. Alternatively, the redistribution range may be calculated by Equation 4. In this case, the valid redistribution factor may be the redistribution probability value of a cell available for the UE.

The UE may receive a frequency list from the network. The frequency list may be received via a system information block. In this case, the redistribution range may be calculated when a frequency available for the UE is different from a frequency included in the frequency list.

The UE may perform a redistribution procedure based on the calculated redistribution range. The redistribution procedure may be performed between frequencies available for the UE.

Figure 12:
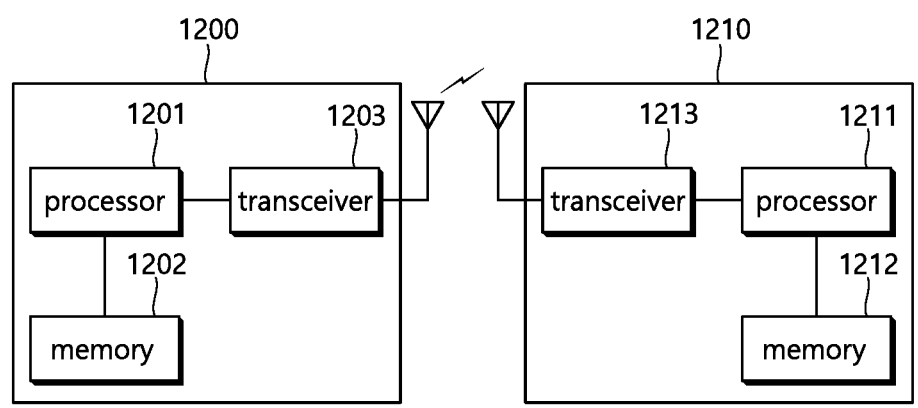
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), a redistribution procedure in a wireless communication system, the method comprising:
receiving redistribution factors from a network;
determining at least one valid redistribution factor among the redistribution factors;
obtaining at least one redistribution range, by dividing the at least one valid redistribution factor by a sum of the at least one valid redistribution factor; and
performing the redistribution procedure, based on the at least one redistribution range,
wherein the at least one valid redistribution factor is a redistribution probability value of a frequency or a cell valid for the UE.

2. The method of claim 1, wherein the redistribution factors are received via a system information block (SIB).

3. The method of claim 1, further comprising:
receiving, by the UE, a frequency list from the network.

4. The method of claim 3, wherein the frequency list is received via an SIB.

5. The method of claim 3, wherein the redistribution range is obtained when a frequency valid for the UE is different from a frequency included in the frequency list.

6. The method of claim 1, wherein the UE is in an RRC_IDLE mode.

7. The method of claim 1, wherein the redistribution range is obtained based on the following equation:

$$\text{Redistribution range } [i] = \frac{\text{Valid redistribution factor } [i]}{\sum_{j=0}^{\substack{j=\text{Total number of frequencies} \\ \text{with valid redistribution factor}-1}} \text{Valid redistribution factor } [j]}.$$

8. The method of claim 7, wherein the redistribution factors are a redistribution probability value per frequency for load balancing.

9. The method of claim 8, wherein the redistribution procedure is performed on frequencies valid for the UE.

10. The method of claim 1, wherein the redistribution range is obtained based on the following equation:

$$\text{Redistribution range } [i] = \frac{\text{Valid redistribution factor } [i]}{\sum_{j=0}^{\substack{j=\text{Total number of cells} \\ \text{with valid redistribution factor}-1}} \text{Valid redistribution factor } [j]}.$$

11. The method of claim 10, wherein the redistribution factors are a redistribution probability value per cell for load balancing.

12. A user equipment (UE) for performing a redistribution procedure in a wireless communication system, the UE comprising:
at least one memory;
at least one transceiver; and
at least one processor, operably coupled to connect the memory and the transceiver,
wherein the at least one processor is configured to:
control the at least one transceiver to receive redistribution factors from a network;
determine at least one valid redistribution factor among the redistribution factors;
obtain at least one redistribution range, by dividing the at least one valid redistribution factor by a sum of the at least one valid redistribution factor; and
perform the redistribution procedure, based on the at least one redistribution range,
wherein the at least one valid redistribution factor is a redistribution probability value of a frequency or a cell valid for the UE.

13. The UE of claim 12, wherein the redistribution factors are received via a system information block (SIB).

14. The UE of claim 12, wherein the at least one processor is further configured to:
control the at least one transceiver to receive a frequency list from the network.

15. The UE of claim 14, wherein the frequency list is received via an SIB.

16. The UE of claim 12, wherein the redistribution range is obtained based on the following equation:

$$\text{Redistribution range } [i] = \frac{\text{Valid redistribution factor } [i]}{\sum_{j=0}^{j=\text{Total number of frequencies with valid redistribution factor}-1} \text{Valid redistribution factor } [j]}.$$

17. The UE of claim 16, wherein the redistribution factors are a redistribution probability value per frequency for load balancing.

18. The UE of claim 17, wherein the redistribution procedure is performed on frequencies valid for the UE.

19. The UE of claim 12, wherein the redistribution range is obtained based on the following equation:

$$\text{Redistribution range } [i] = \frac{\text{Valid redistribution factor } [i]}{\sum_{j=0}^{j=\text{Total number of cells with valid redistribution factor}-1} \text{Valid redistribution factor } [j]}.$$

20. The UE of claim 19, wherein the redistribution factors are a redistribution probability value per cell for load balancing.

* * * * *